US009654352B2

(12) United States Patent
Liu et al.

(10) Patent No.: US 9,654,352 B2
(45) Date of Patent: *May 16, 2017

(54) BROKERING DATA ACCESS REQUESTS AND RESPONSES

(71) Applicant: Microsoft Technology Licensing, LLC, Redmond, WA (US)

(72) Inventors: Zhen Liu, Tarrytown, NY (US); Bobby Chiu Chun Mak, Beijing (CN); Jerry Huang, Redmond, WA (US); Jun He, Beijing (CN); Xiaomin Deng, Beijing (CN); QingHu Li, Beijing (CN); Wei Pu Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,194

(22) Filed: Feb. 10, 2016

(65) Prior Publication Data
US 2016/0164751 A1  Jun. 9, 2016

Related U.S. Application Data

(63) Continuation of application No. 14/557,342, filed on Dec. 1, 2014, now Pat. No. 9,305,178.

(30) Foreign Application Priority Data

Jul. 15, 2014  (WO) ................ PCT/CN2014/082214

(51) Int. Cl.
*H04L 12/24* (2006.01)
*G06F 21/62* (2013.01)
*H04L 12/911* (2013.01)
*H04L 29/06* (2006.01)

(52) U.S. Cl.
CPC .......... *H04L 41/28* (2013.01); *G06F 21/6227* (2013.01); *G06F 21/6236* (2013.01); *H04L 47/783* (2013.01); *H04L 63/20* (2013.01)

(58) Field of Classification Search
CPC ........ H04L 41/28; H04L 63/20; H04L 47/783
See application file for complete search history.

(56) References Cited

U.S. PATENT DOCUMENTS

| 6,192,405 | B1* | 2/2001 | Bunnell | H04L 63/104 |
| | | | | 709/202 |
| 7,035,899 | B2* | 4/2006 | Marchon | H04L 29/06027 |
| | | | | 348/E7.083 |
| 2009/0276667 | A1* | 11/2009 | Dopson | G06F 9/5027 |
| | | | | 714/48 |
| 2010/0325199 | A1* | 12/2010 | Park | G06F 17/30067 |
| | | | | 709/203 |
| 2013/0066940 | A1* | 3/2013 | Shao | H04L 67/1025 |
| | | | | 709/201 |
| 2013/0067531 | A1* | 3/2013 | Morris | G06F 21/54 |
| | | | | 726/1 |

* cited by examiner

*Primary Examiner* — Beemnet Dada
(74) *Attorney, Agent, or Firm* — Dodd Law Group; Michael B. Dodd

(57) ABSTRACT

The present invention extends to methods, systems, and computer program products for brokering data access requests and responses. Aspects of the invention include a brokering pipeline that sequentially processes data access requests and data access responses. The brokering pipeline manages access authentications, request brokering, response rewrite, cache, and hosting multiple (e.g., business) entities.

20 Claims, 2 Drawing Sheets

BROKERING DATA ACCESS REQUESTS AND RESPONSES

CROSS-REFERENCE TO RELATED APPLICATIONS

This application is a continuation of and claims the benefit of and priority to U.S. patent application Ser. No. 14/557,342, entitled "Brokering Data Access Requests And Responses", filed Dec. 1, 2014 by Zhen Liu et. al., the entire contents of which are expressly incorporated by reference. This application claims priority to PCT Application No. CN2014/082214, filed Jul. 15, 2014, and entitled "Brokering Data Access Requests And Responses"

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, one computer system exchanges data with another computer system using a web service. Generally, a web service is a method of communication between two electronic devices over a network. A web service can provide a software function at a network address over the web with the service always on. A computer system that requests data is called a service requester. On the other hand, the computer system that processes the request and provides the data is called a service provider.

Many web services are built primarily for data access and have very simple (if any) business logic. For example, a service provider may filter out data based on various criteria before returning results to a service requester. In any event, a web service façade has to be built for each web service regardless of its complexity. Web service façades can be built with similar code and security considerations.

However, use of web service façades can also introduce inconsistencies in security polices and security enforcement across web services. Web services are built by human developers. As such, each web service may be developed with its own way of doing security polices and enforcements (e.g., authorization). When an enterprise has many web services, security inconsistencies between web services increases the complexity of the enterprise security infrastructure. That is, the enterprise may have to maintain multiple different mechanisms for authentication, authorization, etc. Every web service also has to handle its own performance concerns.

An enterprise service bus (ESB) is a software architecture model used for designing and implementing communication between mutually interacting software applications in a service-oriented architecture (SOA). An ESB can be used to manage and route requests to a specified web service that has been built by a developer. An ESB can be used to help insure that a service requester is matched to an appropriate service provider. However, after communication is established, security inconsistencies and variable performance concerns can still exist.

BRIEF SUMMARY

The present invention extends to methods, systems, and computer program products for brokering data access requests and responses. Aspects of the invention include registering query logic with a query engine. Aspects of the invention also include a brokering pipeline that brokers data access requests and corresponding response. The brokering pipeline can receive data access requests from external identities (i.e., from outside a security boundary), map external identities to internal identities, match data requests for internal identities to previously registered query logic, receive responses including requested data back from registered query logic, and re-write responses to indicate that the responses were sent form the brokering pipeline.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only some implementations of the invention and are not therefore to be considered to be limiting of its scope, the invention will be described and explained with additional specificity and detail through the use of the accompanying drawings in which.

DETAILED DESCRIPTION

Figure 1:
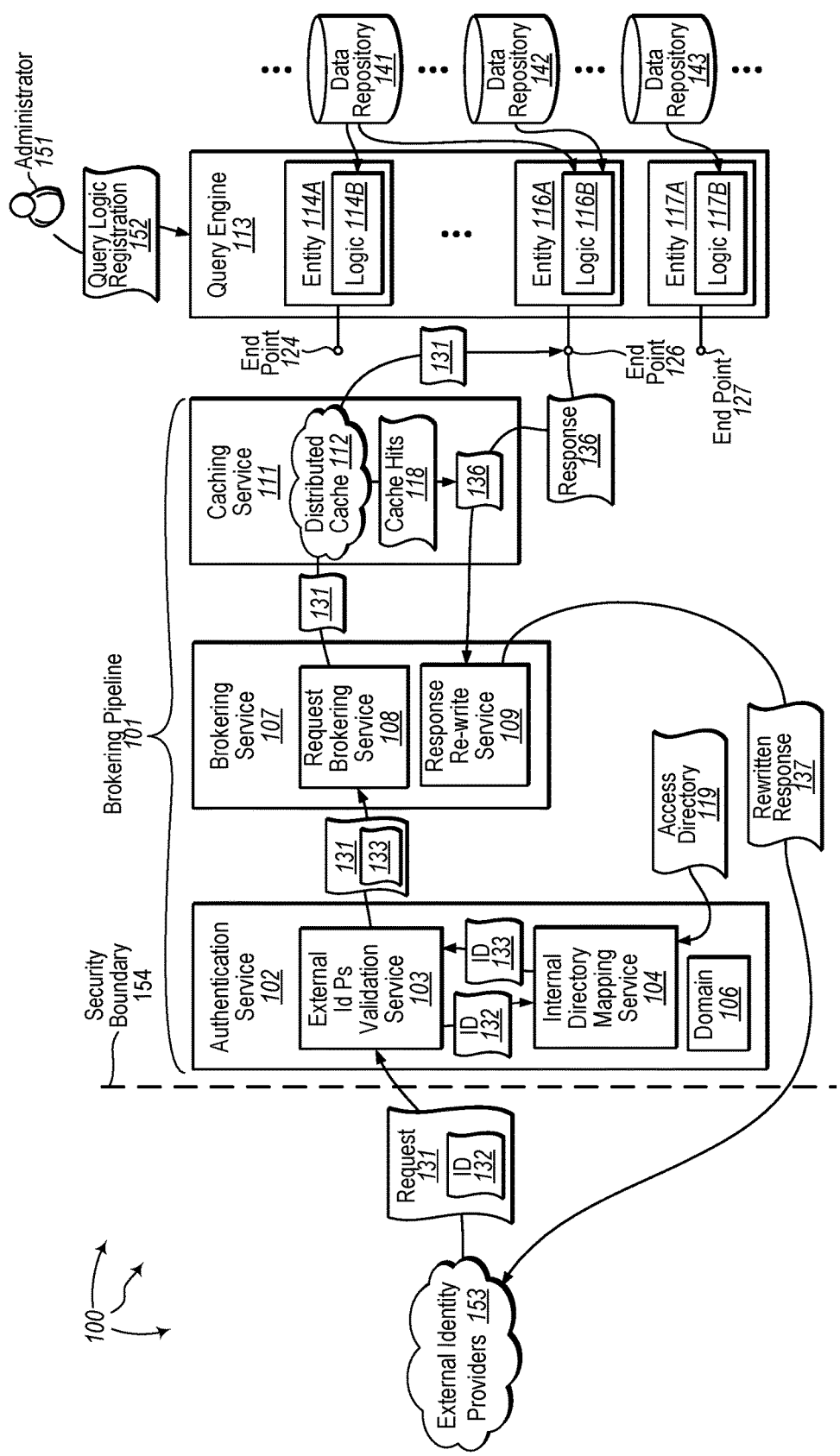
FIG. 1 illustrates an example computer architecture that facilitates brokering data access requests and responses.

The present invention extends to methods, systems, and computer program products for brokering data access requests and responses. Aspects of the invention include registering query logic with a query engine. Aspects of the invention also include a brokering pipeline that brokers data access requests and corresponding response. The brokering pipeline can receive data access requests from external identities (i.e., from outside a security boundary), map external identities to internal identities, match data requests for internal identities to previously registered query logic, receive responses including requested data back from registered query logic, and re-write responses to indicate that the responses were sent form the brokering pipeline.

Implementations of the present invention may comprise or utilize a special purpose or general-purpose computer including computer hardware, such as, for example, one or more processors and system memory, as discussed in greater detail below. Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

FIG. 1 illustrates an example computer architecture 100 that facilitates brokering data access requests and responses. Referring to FIG. 1, computer architecture 100 includes external identify providers 153, brokering pipeline 101, query engine 113, and data repositories 141, 142, and 143. Each of external identify providers 153, brokering pipeline 101, query engine 113, and data repositories 141, 142, and 143 can be connected to one another over (or be part of) a network, such as, for example, a Local Area Network ("LAN"), a Wide Area Network ("WAN"), and even the Internet. Accordingly, each of external identify providers 153, brokering pipeline 101, query engine 113, and data repositories 141, 142, and 143, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, security boundary 154 separates external identity providers 153 from brokering pipeline 101, query engine 113, and data repositories 141, 142, 143, etc. External identity providers 153 can be located on a public network, such as, for example, the Internet. Brokering pipeline 101, query engine 113, and data repositories 141, 142, 143, etc. can be located on a private network, such as, for example, a corporate intranet. Thus, components implementing security boundary 154 (e.g., a firewall) protect brokering pipeline 110, query engine 113, and data repositories 141, 142, 143, etc. from threats originating on the public network.

Generally, external entity providers 153 can associate an external identity with data requests submitted to brokering pipeline 101. External entity providers 153 can be spread across a plurality of different computing domains.

Brokering pipeline 101 includes authentication service 102, brokering service 107, and caching service 111. Authentication service 102 further includes external IdPs validation service 102, internal directory mapping service 104, and domain 106. External IdPs validation service 102 is configured to validate external Ids for public access brokering pipeline 101. Internal directory mapping service 104 is configured to refer to access directory 119 (e.g., an Active Directory®) to map an external Id to a one or more corresponding internal Id(s) (e.g., an Active Directory® account or accounts). Domain 106 is an internal domain that supports authentications and authorizations for internal users and systems.

Brokering service 107 includes request brokering service and response re-write service. Based on an internal Id, request brokering service 107 can match a data access request to previously registered query logic at query engine 113. Request brokering service 108 is configured to send a data access request to caching service 111 and/or onto a defined endpoint for the previously registered query logic. Response re-write service 109 is configured to receive data access responses from defined endpoints for registered query logic. Response re-write service 109 can re-write a data access response to make it appear as if the data access response was returned from brokering pipeline 101 (instead of the defined endpoint).

Caching service 111 is configured to maintain distributed cache 112. Distributed cache 112 is a distributed cached capable of cross-machine access. Caching service 111 can monitor changes to data repositories 141, 142, 143, etc. (as well as other backend data) to keep distributed cache 112 up to date.

When a data access request is received, caching service 111 can check distributed cache 112 to determine if some or all of requested data is cached. If any requested data is cached, the requested data that is cached can be returned from distributed cache 112 into a corresponding data access response.

Any requested data that is not cached in distributed cache 112 can be retrieved from a defined endpoint (for registered query logic) matched to a data access request.

Query engine 113 is configured to receive query logic registrations from users, such as, system operators or data administrators. When a query logic registration is received, query engine 113 registers an entity and encapsulates appropriate query logic within the entity. Query engine 113 can define an endpoint for data access requests directed to the query logic. As appropriate, query logic can be configured to retrieve requested data from one or more of data repositories 141, 142, 143 etc.

For example, administrator 151 can submit query logic registration 152 to query engine 113. In response to receiving query registration 152, query engine 113 can register an entry for entity 114A and encapsulate logic 114B within entity 114A. Query engine can define end point 124 for data access requests directed to logic 114B. Query engine 113 can configure logic 114B to retrieve data from data repository 141. Repository 141 can contain data that is of interest to administrator 151 and/or of interest to other users associated with administrator 151.

Administrator 151 or another user can also (or previously) have submitted query logic registrations causing query engine 113 to register entities 116A and 117A. Entity 116A encapsulates logic 116B and has endpoint 126 for data access requests directed to logic 116B. Logic 116B is configured to retrieve data from data repositories 141 and 142. Similarly, entity 117A encapsulates logic 117B and has endpoint 127 for data access requests directed to logic 117B. Logic 117B is configured to retrieve data from data repository 143.

Figure 2:
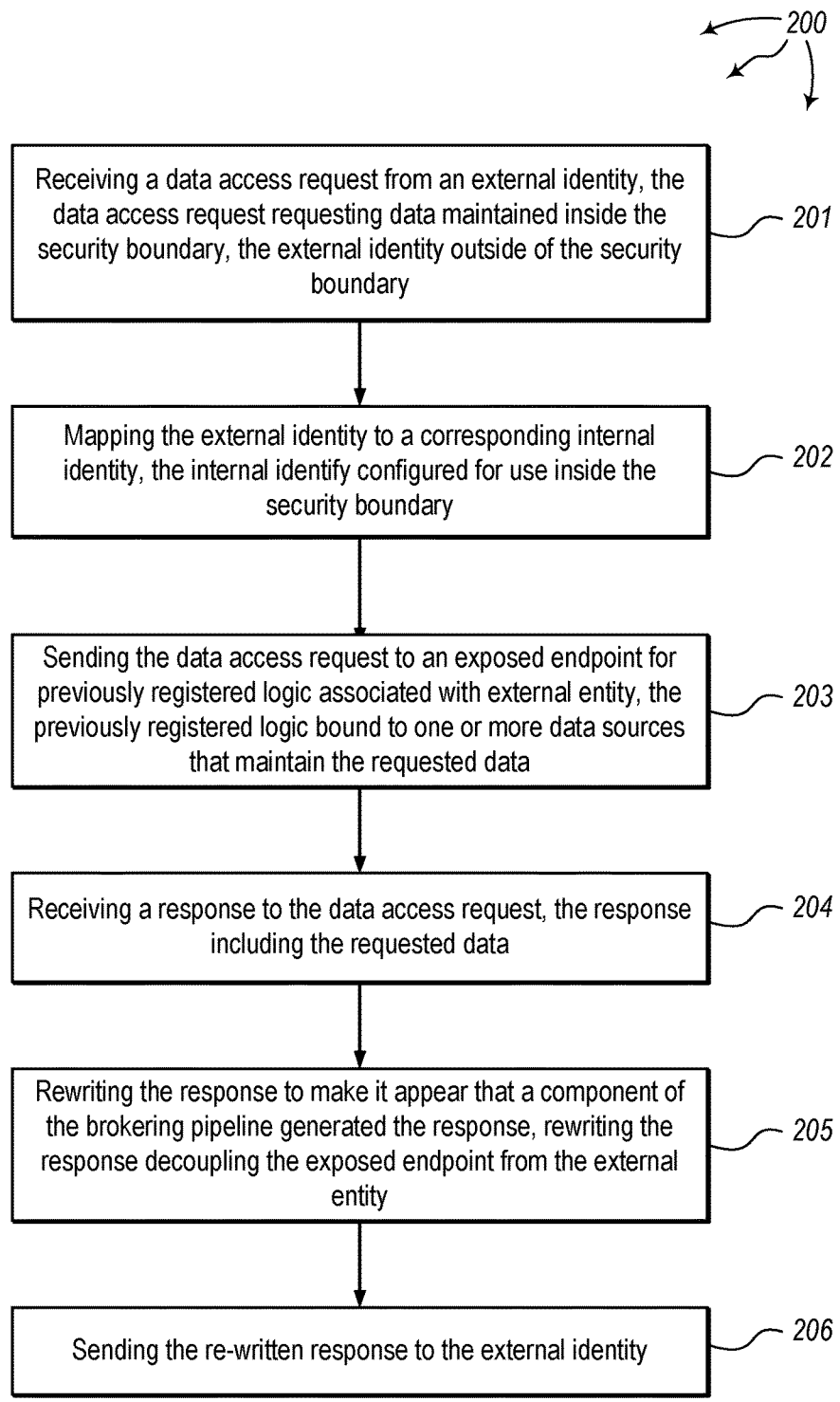
FIG. 2 illustrates a flow chart of an example method for brokering data access requests and responses.

FIG. 2 illustrates a flow chart of an example method 200 for brokering data access requests and responses. Method 200 will be described with respect to the components and data of computer architecture 100.

Method 200 includes receiving a data access request from an external identity, the data access request requesting data maintained inside the security boundary, the external identity outside of the security boundary (201). For example, authentication service 102 can receive request 131 from external identity providers 153. Request 131 can request access to data inside security boundary 154. Request 131 includes ID 132 indicating an external identity.

Upon receiving request 131, external IdPs validation service 103 can validate ID 132 for public access to brokering pipeline 101. External IdPs validation service 103 can also validate the domain where request 131 originated for private access to brokering pipeline 101.

Method 200 includes mapping the external identity to a corresponding internal identity, the internal identify configured for use inside the security boundary (202). For example, internal directory mapping service 104 can refer to access directory 119 to map ID 132 to a corresponding internal ID 133. Internal ID 133 can be configured for use inside security boundary 154. In one aspect, internal ID 133 is a valid Active Directory® account impersonation used to access further components in brokering pipeline 101.

Authentication service 102 can send request 131, in association with internal ID 133, brokering service 107. Request brokering service 108 can match request 131 to entity 116A. For example, request 131 may be from an employee of a company that stores data in data repositories 141 and 142.

Method 200 includes sending the data access request to an exposed endpoint for previously registered logic associated with external entity, the previously registered logic bound to one or more data sources that maintain the requested data (203). For example, request brokering service 108 can send request 131 to endpoint 126. As described, endpoint 126 is defined for logic 116B and logic 116B is bound to data repositories 141 and 142.

Request 131 can travel through caching service 111. Caching service 111 can check distributed cache 112 to determine if any requested data is cached in distributed cache 112.

Query engine 113 can receive request 131 can endpoint 126. Logic 116B can process request 131 and retrieve requested data from data repositories 141 and 142. Query engine 131 can include the requested data in response 136. Query engine 113 can return response 136 to brokering service 107

Any requested data cached in distributed cache 112 can be integrated into response 136. For example, cache hits 118 (if there are any) can be integrated into response 136.

Method 200 includes receiving a response to the data access request, the response including the requested data (204). For example, brokering service 107 can receive response 136.

Method 200 includes rewriting the response to make it appear that a component of the brokering pipeline generated the response, rewriting the response decoupling the exposed endpoint from the external identity (205). For example, response re-write service 109 can rewrite response 136 as rewritten response 137. Rewritten response 137 can be similar to response 136 but can indicate that brokering service 107 returned the requested data. Thus, rewritten response 137 decouples endpoint 126 from external ID 132.

Method 200 includes sending the re-written response to the external identity (206). For example, brokering service 107 can send rewritten response 137 to a source of request 131 within external identity providers 135.

Accordingly, aspects of the invention include a brokering pipeline that sequentially processes data access requests and data access responses. The brokering pipeline manages access authentications, request brokering, response rewrite, cache, and hosting multiple (e.g., business) entities.

In general, aspects of the invention are advantageous because any Web service or unit of business entity can be registered through a common query language, such as, for example, Odata, URIs, HiveQL, T-SQL, Multi-dimensional Expressions (MDX), Data Mining Extensions (DMX), etc., rather than building it via programming languages. Security mechanisms are more consistently applied because an access directory (e.g., Active Directory®) is utilized for authentication and authorization and incoming request identities are mapped to internal (e.g., platform) identities. The pipeline based architecture increases performance since incoming requests flow through while providing distributed cache prior to reaching a target (e.g., business) entity.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
   one or more processors;
   system memory coupled to the one or more hardware processors, the system memory storing instructions that are executable by the one or more hardware processors;
   the one or more processors configured to execute the instructions stored in the system memory to perform the following:
   receive a data access request from an entity outside a security boundary, the data access request requesting data maintained inside the security boundary;
   access a response for the data access request from an exposed endpoint, the exposed endpoint for an internal identity used inside the security boundary, the entity having been mapped to the internal identity;
   decouple the exposed endpoint from the entity by rewriting the response to make it appear that a component of a brokering pipeline generated the response; and
   send the re-written response to the entity.

2. The computer system of claim 1, further comprising the one or more processors configured to execute the instructions stored in the system memory to map the entity to the internal identity.

3. The computer system of claim 2, wherein the one or more processors configured to execute the instructions stored in the system memory to map the entity to the internal identity comprises the one or more processors configured to execute the instructions stored in the system memory to refer to an access directory to determine that the entity maps to the internal identity.

4. The computer system of claim 1, further comprising the one or more processors configured to execute the instructions stored in the system memory to validate the entity for public access to the brokering pipeline.

5. The computer system of claim 1, further comprising the one or more processors configured to execute the instructions stored in the system memory to send the data access request to the exposed endpoint.

6. The computer system of claim 1, further comprising the one or more processors configured to execute the instructions stored in the system memory to:
   register logic associated with the entity at a query engine; and
   send the data access request to the registered logic.

7. The computer system of claim 1, wherein the one or more processors configured to execute the instructions stored in the system memory to receive a data access request from an entity outside a security boundary comprises the one or more processors configured to execute the instructions stored in the system memory to receive a data access request from a computing domain; and
   further comprising the one or more processors configured to execute the instructions stored in the system memory to validate the computing domain for private access to one or more data repositories.

8. The computer system of claim 1, wherein the one or more processors configured to execute the instructions stored in the system memory to access a response for the data access request comprises the brokering service, using the one or more processors, configured to access the response from a caching layer of the brokering pipeline.

9. The computer system of claim 1, wherein the one or more processors configured to execute the instructions stored in the system memory to access a response for the data access request comprises the one or more processors configured to execute the instructions stored in the system memory to access a response that includes the requested data returned from one or more data repositories.

10. A method for use at a computer system, the computer system including a processor, the method for brokering a data access request, the method comprising the processor:
    receiving a data access request from an entity outside a security boundary, the data access request requesting data maintained inside the security boundary;
    accessing a response for the data access request from an exposed endpoint, the exposed endpoint for an internal identity used inside the security boundary, the entity having been mapped to the internal identity;
    decoupling the exposed endpoint from the entity by rewriting the response to make it appear that a component of a brokering pipeline inside the security boundary generated the response; and
    sending the re-written response to the entity.

11. The method of claim 10, further comprising mapping the entity to the internal identity.

12. The method of claim 11, wherein mapping the entity to the internal identity comprises referring to an access directory to determine that the entity maps to the internal identity.

13. The method of claim 10, further comprising validating the entity for public access to the brokering pipeline.

14. The method of claim 10, further comprising registering logic associated with the entity at a query engine.

15. The method of claim 10, wherein receiving a data access request from an entity outside a security boundary comprises receiving a data access request from a computing domain; and
further comprising validating the computing domain for private access to the one or more data repositories.

16. The method of claim 10, further comprising sending the data access request to the exposed endpoint.

17. The method of claim 16, wherein sending the data access request to the exposed endpoint comprises sending the data access request to registered logic at a query engine.

18. The method of claim 1, wherein accessing a response for the data access request comprises accessing a response that includes the requested data returned from a caching layer of the brokering pipeline.

19. The method of claim 1, wherein accessing a response to for data access request comprises accessing a response that includes the requested data returned from one or more data repositories.

20. A computer program product for use at a computer system, the computer program product for implementing a method for brokering a data access request, the computer program product comprising one or more computer storage devices having stored thereon computer-executable instructions that, when executed at a processor, cause the computer system to perform the method, including the following:
receive a data access request from an entity outside a security boundary, the data access request requesting data maintained inside the security boundary;
access a response for the data access request from an exposed endpoint, the exposed endpoint for an internal identity used inside the security boundary, the entity having been mapped to the internal identity;
decouple the exposed endpoint from the entity by rewriting the response to make it appear that a component of a brokering pipeline inside the security boundary generated the response; and
send the re-written response to the entity.

* * * * *